United States Patent
Stevens et al.

(10) Patent No.: US 12,280,615 B2
(45) Date of Patent: Apr. 22, 2025

(54) CENTER CAP ADAPTOR WITH SPECIALIZED LUG NUT

(71) Applicant: A2I, Inc., Holt, MI (US)

(72) Inventors: Adam Stevens, Haslett, MI (US); Keith Ramthun, Montague, MI (US)

( * ) Notice: Subject to any disclaimer, the term of this patent is extended or adjusted under 35 U.S.C. 154(b) by 564 days.

(21) Appl. No.: 17/382,474

(22) Filed: Jul. 22, 2021

(65) Prior Publication Data
US 2022/0118792 A1  Apr. 21, 2022

Related U.S. Application Data (60) Provisional application No. 63/094,522, filed on Oct. 21, 2020.

(51) Int. Cl.
*B60B 7/06* (2006.01)
*B60B 7/00* (2006.01)

(52) U.S. Cl.
CPC ............ *B60B 7/0013* (2013.01); *B60B 7/068* (2013.01)

(58) Field of Classification Search
CPC ....... B60B 7/068; B60B 7/0013; B60B 3/145; B60B 3/147
USPC ........................ 301/37.371, 37.372
See application file for complete search history.

(56) References Cited

U.S. PATENT DOCUMENTS

| | | | | |
|---|---|---|---|---|
| 3,046,058 | A * | 7/1962 | Hamer | F16F 15/36 301/5.21 |
| 3,995,461 | A * | 12/1976 | Hudson | B60B 7/068 70/225 |
| 5,222,785 | A * | 6/1993 | Green | B60B 7/068 301/37.35 |
| 6,254,194 | B1 * | 7/2001 | Capouellez | B60B 7/068 301/37.23 |
| 10,417,941 | B1 * | 9/2019 | Green | G09F 21/045 |
| 2002/0008421 | A1 * | 1/2002 | Hsu | B60B 7/14 301/37.371 |
| 2003/0102712 | A1 * | 6/2003 | Fitzgerald | B60B 7/20 301/37.25 |
| 2013/0071204 | A1 * | 3/2013 | Hunter | F16B 37/14 411/429 |
| 2013/0076106 | A1 * | 3/2013 | Mooney | B60B 7/20 301/37.25 |
| 2015/0251488 | A1 * | 9/2015 | Hoff | B60B 7/068 411/81 |

FOREIGN PATENT DOCUMENTS

| | | | |
|---|---|---|---|
| JP | 60222301 | A * | 4/1984 |
| KR | 200415639 | Y1 * | 1/2006 |

(Continued)

*Primary Examiner* — Kip T Kotter
(74) *Attorney, Agent, or Firm* — Trace H. Jackson (57) ABSTRACT

Methods and apparatus for attaching a center cap a wheel of a motor vehicle. A specialized lug nut may replace existing lug nuts to provide a threaded receiving area for a screw. The screw may be used to secure a cap in place. Some embodiments include an adapter to match a lug bolt pattern to a cap diameter size. In preferred embodiments, a lug nut is provided of specific designs, size and shape to be installable to act as a mechanism to secure a wheel to a vehicle and also act as a holder for the screw to retain the cap. The center cap may then slide onto the lug nuts (or extension that attach to the lug nuts) and then stay on by tightening a screw through the top of one or more lug nuts on each wheel.

19 Claims, 9 Drawing Sheets

(56) References Cited

FOREIGN PATENT DOCUMENTS

| KR | 101551379 B1 | * | 3/2015 | |
|----|---|---|---|---|
| WO | WO-2014000109 A1 | * | 1/2014 | ............. A01B 76/00 |
| WO | WO-2020069562 A1 | * | 4/2020 | ........... B60B 15/263 |

* cited by examiner

CENTER CAP ADAPTOR WITH SPECIALIZED LUG NUT

FIELD OF THE INVENTION

The present invention relates to an apparatus for a universal lug nut adaptor. Methods and apparatus for attaching a center cap to a wheel of a motor vehicle. A specialized lug nut may replace existing lug nuts to provide a threaded receiving area for a screw. The screw may be used to secure a cap in place. Some embodiments include an adapter to match a lug bolt pattern to a cap diameter size. In preferred embodiments, a lug nut is provided of specific designs, size and shape to be installable to act as a mechanism to secure a wheel to a vehicle and also act as a holder for the screw to retain the cap.

BACKGROUND OF THE INVENTION

For many Americans, cars are one of the highest-valued assets they own. In addition to their practical use as transportation, cars can also be used as vehicles of self-expression. One way Americans use cars as self-expression is by sporting fancy tires or rims on the wheels of the car.

A car wheel generally includes a tire, a rim (the outer edge of the wheel, which holds the tire), a hub (the center of the wheel), and a number of spokes radiating from the hub to a round traction surface on the wheel.

Lug nuts generally fasten a wheel's hub to threaded wheel studs on the car's axle through lug holes on the wheel, thereby securing the wheel in place and centering it properly on the axle. The center bore, on the back of the hub, orients the wheel on the axle.

A center cap is a removable part that covers the center bore of the wheel on the outer face. While center caps may be unique to a given car, approximately 75% of most cars on the road in America use one of three general molds. Adaptors to help convert parts from one type of cap to another are not yet currently in general use.

Many wheel manufacturers discontinue wheels well before the wheels' retail lifecycle ends. As a result, it can be difficult to procure replacement parts for a given wheel. Among the most difficult parts to replace is the wheel's center cap. The center cap can be decorative and is one of the most sought-after parts to complete a set of wheels. However, manufacturing each individual center cap would not be profitable or efficient for wheel manufacturers. Even 3D printing individual center caps is cost- and time-prohibitive due to the intricacies of each center cap.

Moreover, due to the car-specific nature of lug nuts and the myriad designs of various wheels, generic center caps are impractical by traditionally known installation means. Manufacturers and aftermarket vendors have long lamented the lack of adaptability of center caps because of the difficulty to find replacement parts for out-of-production cars.

SUMMARY OF THE INVENTION

Accordingly, the present invention provides methods and apparatus for a center cap capable of adapting to fit on most wheels. An improved lug nut design enables attachment of multiple variations of a center cap to different lug patterns on various vehicles. The improved lug nut is designed to have an outside diameter that is generally maximized as a diameter required to secure the wheel to the car, and has an upper surface with a threaded hole for receiving a screw. The maximized outside diameter includes longitudinal splines or other pattern worked into the surface of the lug nut that mates with a matching complimentary pattern in a socket or wrench for tightening.

In some embodiments, the threaded hole in the upper surface of the lug nut has a tapered opening to guide a screw into the threads and prevent cross threading of the screw during insertion. In some embodiments, the hole may be a groove that the screw can slide into, which may be more appropriate for electric vehicles.

In some specific embodiments, a center cap is attached to a wheel using a screw and/or an adapter item with the specialized improved lug nut. In preferred embodiments, a lug nut is provided of specific designs, size and shape to be installable to act as a mechanism to secure a wheel to a vehicle and also act as a holder for the screw to retain the cap. The center cap may slide onto the lug nuts (or extension that attach to the lug nuts) and be secured by tightening a screw through the top of one or more lug nuts on each wheel.

This screw-tightening method allows for variances in depth from the lug nut to the face of the wheel. This allows the lug nut to sit flush against the wheel. In some embodiments, the cap may be spaced out by extensions to accommodate various wheel designs being capable of being matched to various cap designs. Still further, in some embodiments, one or more cap securing, screw receiving threaded holes may be reverse threaded from another cap securing, screw receiving threaded hole to reduce a chance of the center cap or other wheel components coming off during movement of the car. This is desirable for safety and to protect the driver's investment.

Moreover, this allows for a cap that can fit a variety of bolt patterns and wheel designs. This design does not materially impair wheel removal, as a driver can remove the center cap and then the lug nuts to remove the wheel-just as is done in traditional wheel removal. Spacers and screws may serve as attaching mechanisms to attach the lug nut to the wheel.

Additionally, this may solve the problem of handling specialized lug nuts or losing the key to remove lug nuts. A lug nut that is specifically designed to receive the threaded end of an Allen bolt may be used.

DESCRIPTION OF THE DRAWINGS

The accompanying drawings, which are incorporated in and constituted a part of this specification, illustrate several embodiments of the disclosure. Together with the description, these drawings serve to explain the principles of the disclosure.

DETAILED DESCRIPTION

The present invention relates to methods and apparatus for a center cap with a specialty lug nut that can fit nearly any center cap and wheel combination. A lug nut with a threaded cavity for receiving a screw is inserted into a wheel. A center cap is attached to the wheel with a screw passing through a hole in the center cap and into the lug nut.

In the following sections, detailed descriptions of examples and methods of the invention will be given. The description of both preferred and alternative examples, though thorough, are exemplary only. It is understood that, to those skilled in the art, various, modifications, and alterations may be apparent. The examples do not limit the broadness of the aspects of the underlying invention as defined by the claims.

Figure 1A:
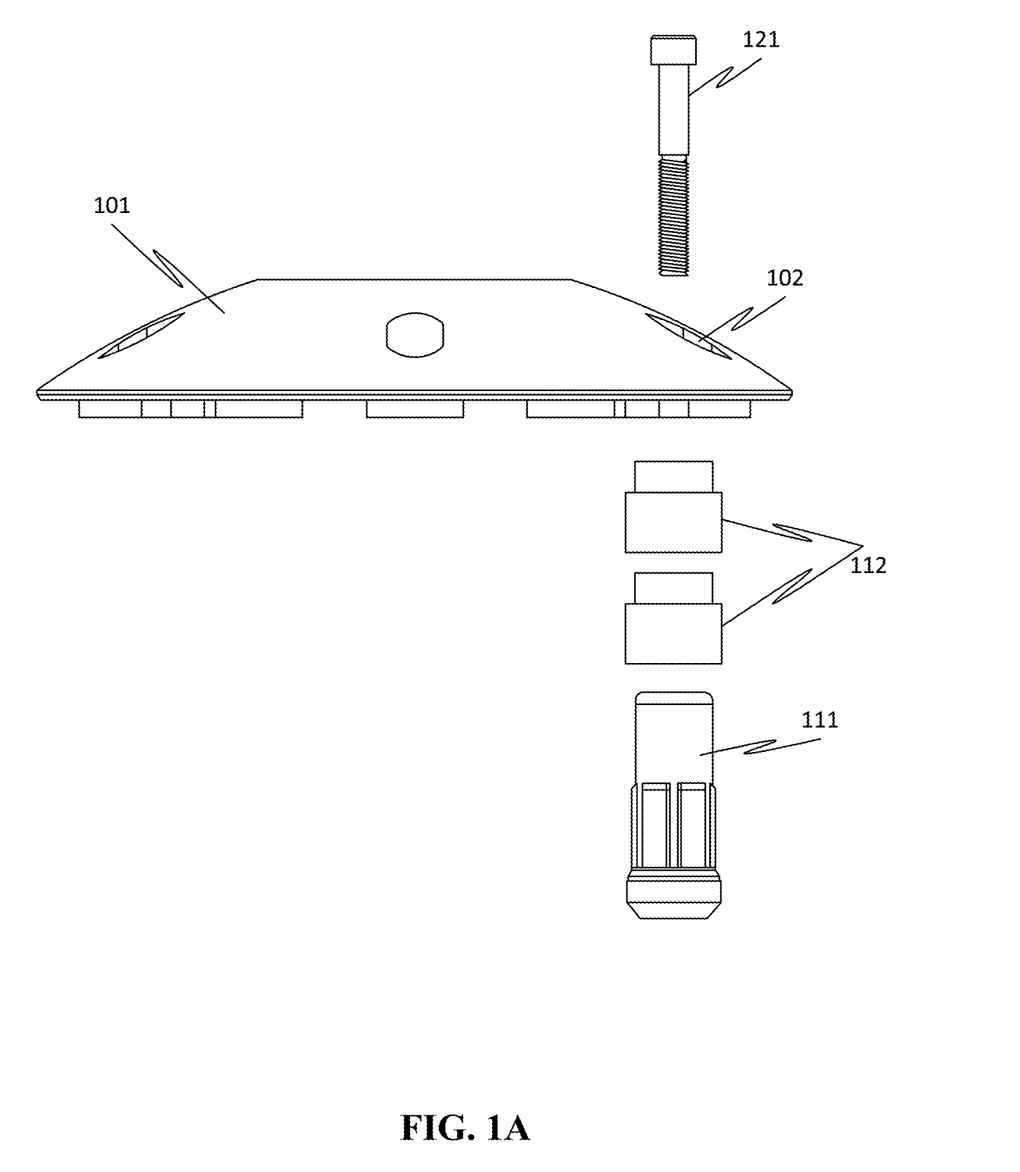
FIGS. 1A-1B illustrate an exemplary embodiment of an attachment mechanism for attaching an adaptor lug nut to a center cap with a screw.
Figure 1B:
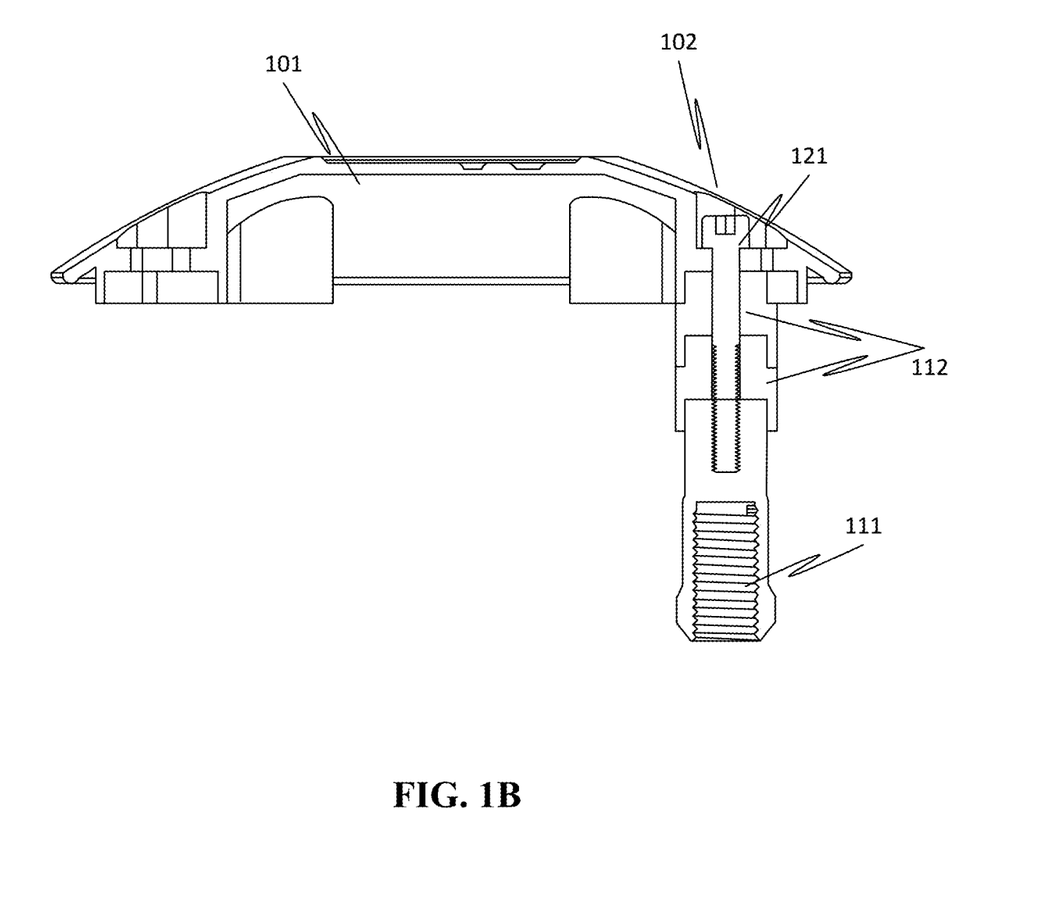
Figures 2A, 2B, 2C, 2D:
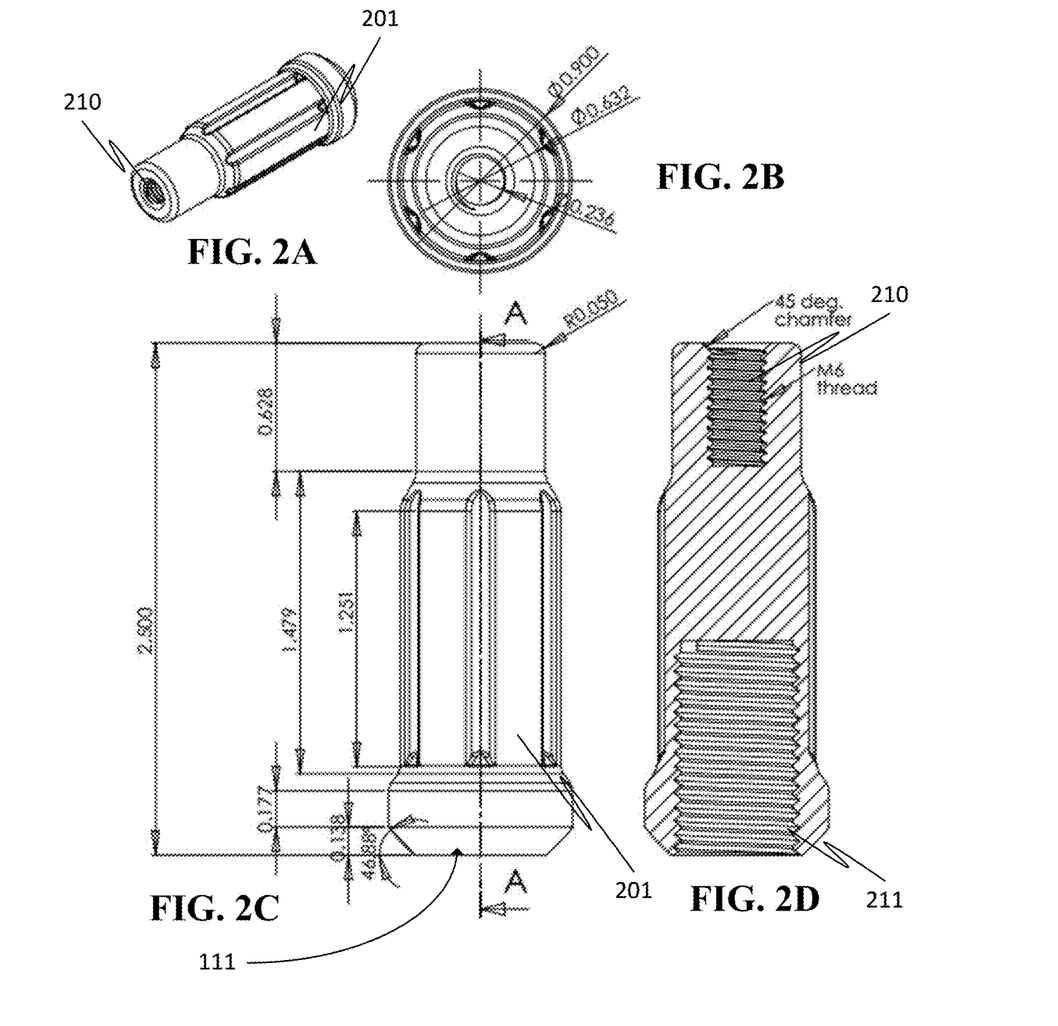
FIGS. 2A-2D illustrate several exemplary views of an adaptor lug nut as used in the present invention.

Referring now to FIGS. 1A-1B, an exemplary embodiment of an attachment mechanism for attaching an adaptor lug nut to a center cap using a screw is shown. FIG. 1A illustrates some of the various parts contemplated for this mechanism as they might appear prior to attachment. The attachment mechanism generally comprises center cap 101, which includes lug hole 102, adaptor lug nut 111, one or more spacers 112, and screw 121.

Center cap 101 may be a center cap as that term is ordinarily understood in the art, or it may be any other structure that may be beneficial for mounting on a wheel and that has one or more holes, such as lug hole 102. Center cap 101 may include various ornamental devices, decorative markings, or practical or stylish apparatus (such as lights).

An important aspect of this invention is that lug hole 102 may have various sizes (based on various diameters, circumferences, shapes, etc.) depending on the manufacturer of center cap 101. The present invention may use spacers to (at least partially) assist in adapting such variations to a wider variety of wheels. Standard sizes for lug hole 102 may include diameters of 9/16", 11/16", 13/16", and 15/16", but other diameters are contemplated hereby. For example, larger lug holes may be appropriate for over-the-road vehicles, recreational vehicles, tractors, and other vehicles. Lug hole 102 may be threaded. Center cap 101 may include one or more lug holes 102 of various sizes. In exemplary embodiments, center cap 101 comprises four, five, or six lug holes to correspond with such holes on a wheel.

In embodiments comprising multiple threaded holes for securing the cap, some holes for securing the cap may be threaded in the opposite direction as other lug holes. In this way, if vehicular motion causes screw 121 to begin to loosen, a screw 121 in an oppositely threaded lug hole 102 may tighten to secure center cap 101 to the wheel despite the turbulent motion that may cause one adaptor lug nut to become cross-threaded.

Optionally, one or more spacers 112 may be inserted into lug hole 102. Spacers 112 are adapted to be placed over a shank of the adaptor lug nut 111 and before center cap 101 to accommodate caps at various distances from a top end of the adapter lug nut 111.

Figure 3:
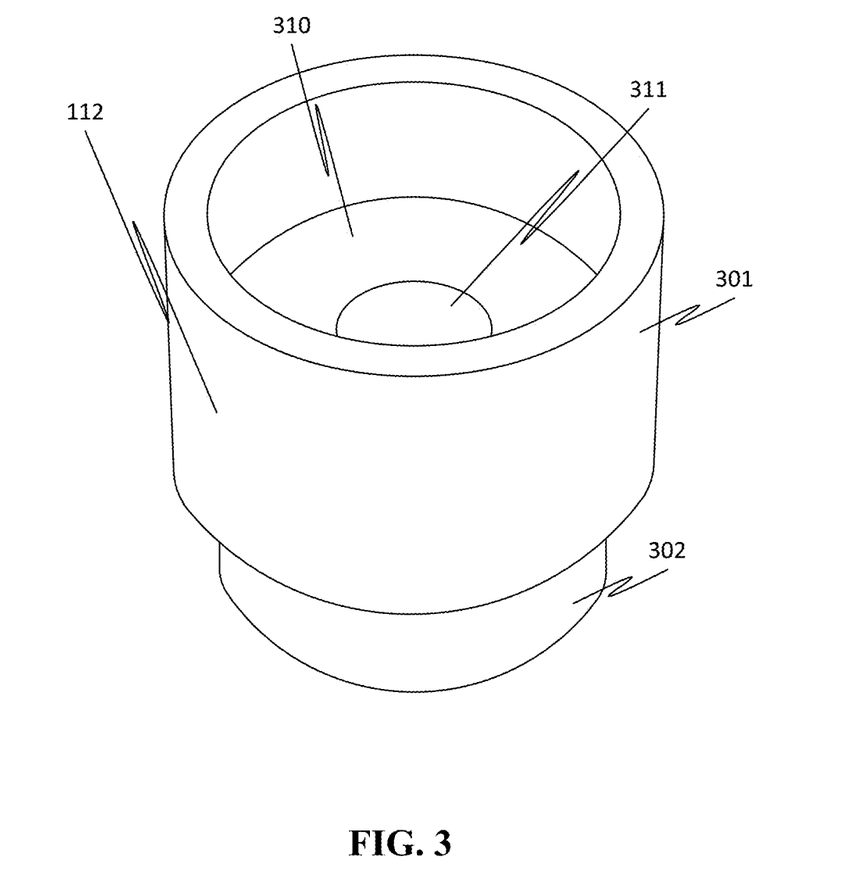
FIG. 3 illustrates a view of a spacer for use in connection with the present invention.

Referring briefly to FIG. 3, an exemplary embodiment of a spacer 112 is shown. Spacer 112 may comprise an upper cylindrical portion 301 having a first diameter and an opening at the top, and a lower cylindrical portion 302 having a second diameter and an opening at the bottom. One or both portions 301 and 302 may have other shapes, such as ocular or rectangular. Upper cylindrical portion 301 may include a ridge 310, which may have hole 311 that provides a channel between upper cylindrical portion 301 and lower cylindrical portion 302.

In some preferred embodiments, screw receiving hole 311 may be tapered to allow for proper seating of a screw that is received into screw receiving hole 311. Additionally, the screw receiving hole 311 is threaded and may be adapted for receiving screws of various length. In still other embodiments, ridge 310 may serve to stabilize a fitting of a screw. The size of ridge 310 may be useful in centering adaptor lug nut 111. In exemplary embodiments, upper cylindrical portion 301 may be adapted to receive a screw or to receive the lower cylindrical portion 302 of another, different spacer.

Lower cylindrical portion 302 may be adapted for insertion into a cavity, such as an upper cylindrical portion 301 of a different spacer. In this way, one spacer 112 may be used to directly connect or attach adaptor lug nut 111 to center cap 101, or multiple spacers 112 may be linked together to extend the perpendicular distance between a wheel (via adaptor lug nut 111) and center cap 101. Moreover, varying the diameter of the upper cylindrical portion 301 may allow for the adaptor lug nut to fit various sizes of wheels.

Referring back to FIG. 1A, adaptor lug nut 111 provides an improved method for securing the wheel to the car and also provides a mechanism for securing a cap to the car. The improved lug includes an interior thread on a hole into a first end of the improved lug nut. The interior thread on the hole into the first end of the improved lug nut includes a diameter and thread pattern suitable for attachment to a lug on a car.

The improved lug may also include an exterior taper on the first end for centering the improved lug nut into a lug hole on a wheel being attached. Centering the lug nut may, among other things, improve the stability of the connection of the center cap to the wheel.

The improved lug nut also includes in interior thread on a second end of the lug nut. The interior thread into the hole on the second end of the lug nut is suitable for receiving a screw for securing the cap to the improved lug nut. The hole into the second end of the lug nut may be tapered to assist in receiving a screw and preventing cross threading of the in the treads.

Because the second end of the improved lug nut is designed for receiving a screw and has a hole into it for that purpose, the improved lug nut includes a longitudinal pattern in a longitudinal surface of the lug nut that may receive a specialized tool for fastening and removing the improved lug nut. The longitudinal pattern may include, for example, one or more longitudinal grooves that can only be engaged by socket wrench, box end wrench, or similar device with a matching complimentary groove counter-pattern (analogous to a lock and key) to secure and/or remove adapter lug nut 111.

Improved adapter lug nut 111 includes a hole at one end for receiving a screw. In some embodiments, this hole may be threaded to receive the appropriate screw, such as screw 121. Screw 121 may be made of any material of sufficient torsional strength, such as steel, stainless steel, brass, zinc, or other metal. In some embodiments, adaptor lug nut 111 may be a lug nut that is specifically designed to receive the threaded end of an Allen head bolt. In such embodiments, screw 121 may be an Allen head bolt.

Referring now to FIG. 1B, center cap 101 is shown with screw 121 threaded through lug hole 102 and received by adaptor lug nut 111 via two spacers 112. As shown, by tightening screw 121, adaptor lug nut 111 may be pulled closer to center cap 101. This may allow for the apparatus to account for variances in depth between adaptor lug nut 111 and the face of a wheel to which it is attached. Screw 121 may be tightened to position adaptor lug nut 111 at the appropriate spatial distance from center cap 101.

In some embodiments, screw 121 may be inserted into any number of the present adaptor lug nuts 111 depending on the bolt pattern. By tightening the screw, variances in depth from the lug nut to the face of the wheel may be accounted for. Center cap 101 may sit flush against the wheel to which it attached, or it may be spaced out by spacers 112.

This also allows center cap 101 to fit a variety of bolt patterns (such as the patterns shown by the longitudinal grooves on adaptor lug nut 111) and most wheel designs. Adaptor lug nut 111 may attach the wheel to a vehicle while also holding center cap 101 in place.

Referring now to FIGS. 2A-2D, various views of an exemplary embodiment of adaptor lug nut 111 are shown. As discussed above, adaptor lug nut 111 may include longitudinal grooves that may serve to "lock" an adaptor lug nut in place. Only by having a "key" wrench or adaptor that matches these grooves can a user remove the adaptor lug nut 111.

In some embodiments, adaptor lug nut 111 includes slot 210. Slot 210 may receive screw 121 (not pictured) into a threaded cavity, which allows adaptor lug nut 111 to attach to a center cap and to have the spacing between adaptor lug nut 111, the center cap 101, and the wheel to be modified. Such modification may include a distance of the spacing or an alignment (e.g., centering the center cap on the wheel). As pictured here, slot 210 includes a threaded bore (such as with an M6 or M4 thread) and may include a chamfer. A chamfer is generally a cut away that can make a generally symmetrical sloping edge into the slot. As shown here, the slope of the chamfer is 45 degrees, but other slopes may be desirable based upon deployment conditions. For example, where the load to be borne by the vehicle to which the wheel is attached may be heavier, a greater angle may be desirable. A chamfer angle may be between 15 and 90 degrees. For certain types of screws, an obtuse chamfer may provide additional security or for aesthetic purposes.

Adaptor lug nut 111 may also include a threaded cavity 211 on an end opposite the end of slot 210. This may fasten to a wheel stud to secure the wheel. The thread on threaded cavity 211 may be specifically customized for a particular wheel or wheel type. In some embodiments, it may be desirable to create a reverse threading to provide additional security for adaptor lug nut 111 to prevent cross-threading, as discussed above.

In some embodiments, adaptor lug nut 111 may include lock pattern 201. Lock pattern 201 may be a series of varied (randomly or periodically) protrusions from and recessions into the adaptor lug nut 111. Lock pattern 201 may correspond with a similar pattern in a wheel lock key (not pictured), such that adaptor lug nut 111 may be removed only by a wheel lock key including such a pattern.

Figure 4A:
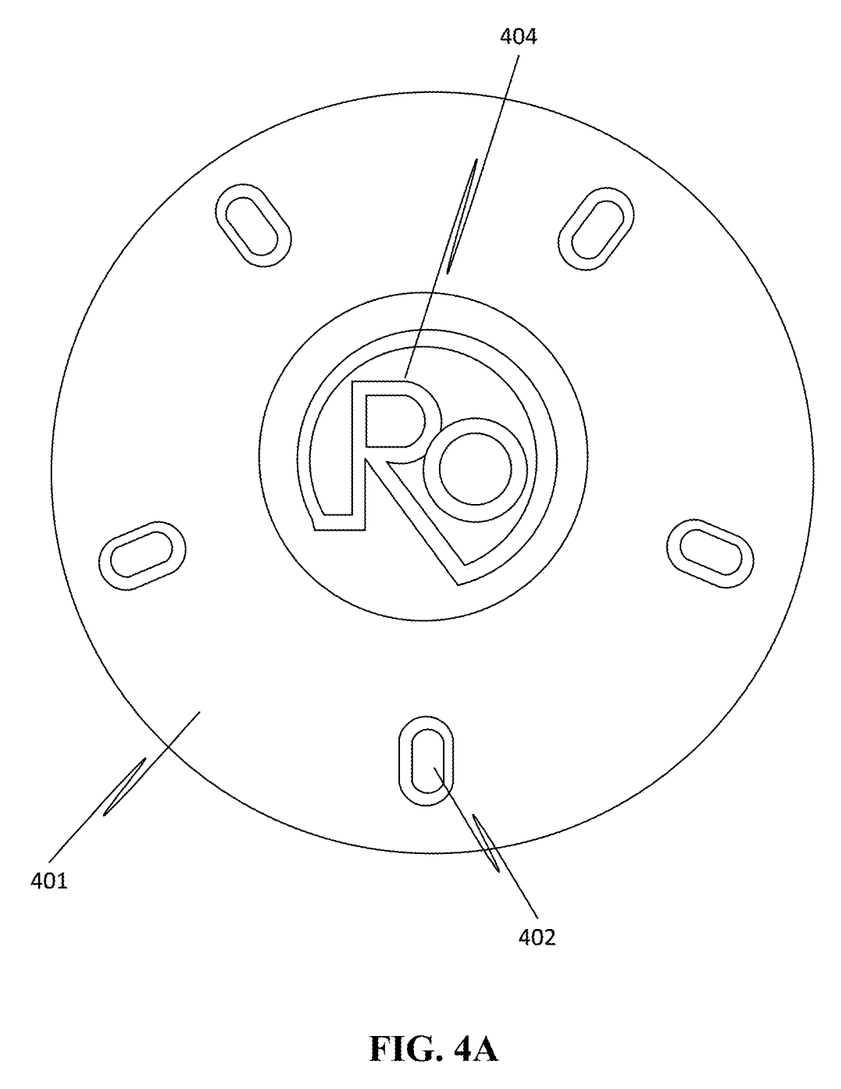
FIGS. 4A-4B illustrate an exemplary embodiment of a five-lug center cap, in accordance with the present invention.

Referring now to FIG. 4A, a top-down view of an exemplary five-hole center cap 401 is shown in accordance with the present invention. Five-hole center cap 401 includes five lug holes 402, as shown in FIGS. 3A-3B, which may be slotted and may serve as hub bores. Additionally, five-hole center cap 401 may include decorative emblem 404. Decorative emblem 404 may be a manufacturer's logo, a personal logo or crest, a brand, a message, an icon, or any other decorative piece that may be desirable on a wheel.

Figure 4B:
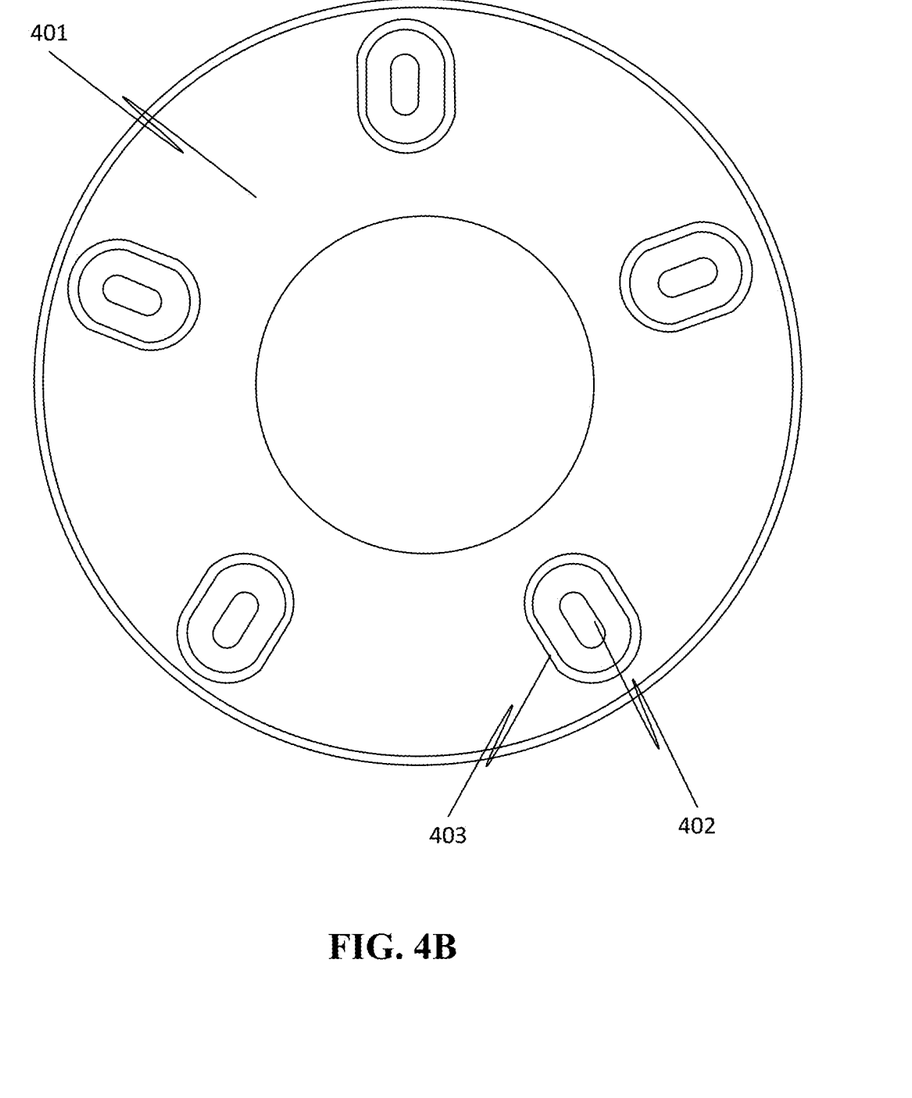

Referring now to FIG. 4B, a bottom-up view of an exemplary five-hole center cap 401 is shown. As before, five-hole center cap 401 includes five lug holes 402. From underneath, one can see receiving grooves 403 in the five lug holes 402. Receiving grooves 403 may receive spacers 112 (not shown). For example, a first spacer may have an appropriate diameter to substantially touch the edges of receiving groove 403. A second spacer may have an upper portion with a diameter capable of receiving the lower portion of the first spacer, and a second portion with a diameter capable of insertion into a lug hole on a wheel. In this way, receiving groove 403 may help center the five-hole center cap 401 on the wheel.

Figure 5A:
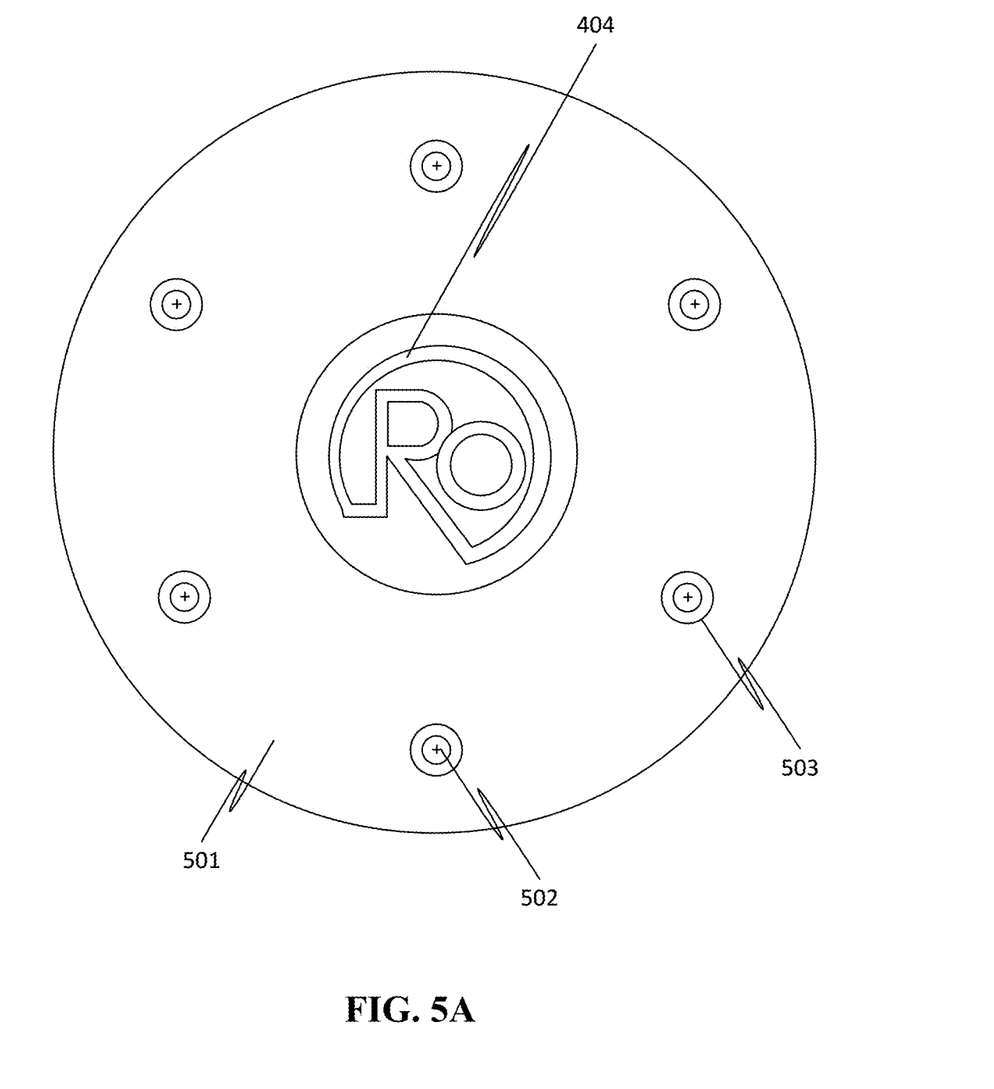
FIGS. 5A-5B illustrate an exemplary embodiment of a six-lug center cap, in accordance with the present invention.
Figure 5B:
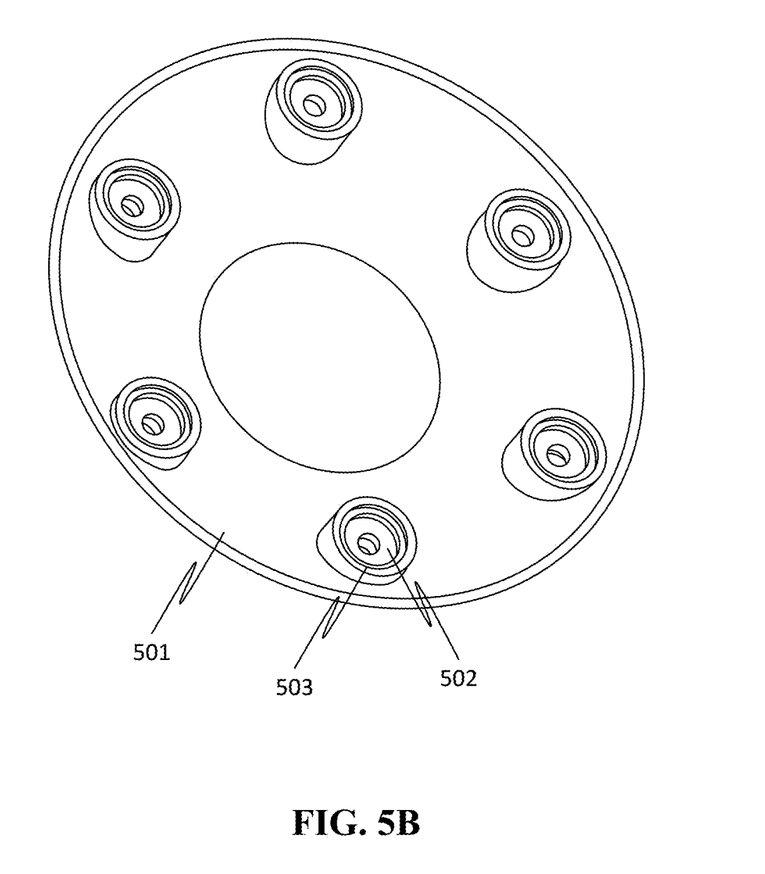

Referring now to FIGS. 5A and 5B, views analogous to those shown in FIGS. 4A and 4B are shown for a six-hole center cap 501 having six lug holes 502. Six-hole center cap 501 may also include decorative emblem 404. One or more of the six lug holes 502 may further include receiving grooves 503, which perform substantially the same function as receiving grooves 403 in five-hole center cap 401.

Figure 6:
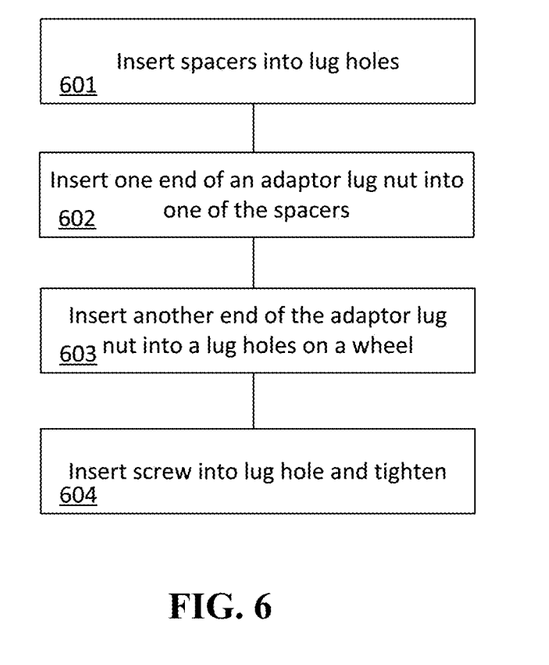
FIG. 6 illustrates exemplary method steps for executing an embodiment of this invention.

Referring now to FIG. 6, a flowchart showing exemplary method steps is shown. At step 601, one or more spacers are inserted into one or more respective lug holes on a center cap. The location (and relative positions) of these holes should correspond with the location and relative positions of the lug holes on a wheel. A spacer may comprise generally an upper portion that is substantially circular with a first diameter, and a lower portion that is also substantially circular with a second diameter. One or both of the upper or lower portions may have other shapes instead, such as ovular or rectangular. Spacers may account for variation in sizes among lug nuts used by various car or wheel manufacturers.

At step 602, one end of an adaptor lug nut may be inserted into one of the spacers. An adaptor lug nut may simply be a lug nut, or it may be an apparatus shaped substantially like a lug nut. In some embodiments, an adaptor lug nut may include one or more longitudinal grooves that can only be engaged by an Allen wrench or similar device with a unique groove counter-pattern (analogous to a lock and key) to secure the adaptor lug nut. The adaptor lug nut may include a hole or slot at one end for receiving a screw. In some embodiments, this hole or slot may be threaded to receive the appropriate screw. As above, the hole or slot may be threaded or include a chamfer At step 603, another end of the adaptor lug nut may be inserted into a lug hole of a wheel. The size of the adaptor lug nut may be chosen based, in part, on the size of the lug hole of the wheel. Standard sizes are 9/16", 11/16", 13/16", and 15/16", but other sizes are contemplated by this disclosure.

At step 604, a screw is inserted into the lug hole and through the spacer and adaptor lug nut. This may allow the center cap to be connected to the wheel via the adaptor lug nut. The screw may be made of any material of sufficient torsional strength, such as steel, stainless steel, brass, zinc, or other metal. The screw may be tightened to account for variances in depth from the lug nut to the face of the wheel. The center cap may sit flush against the wheel to which it attached, or it may be spaced out by spacers. This also allows the center cap to fit a variety of bolt patterns (such as the patterns shown by the longitudinal grooves on the adaptor lug nut in FIG. 1) and most wheel designs.

The center cap may be detached from the wheel by removing the screw and the adaptor lug nut. In some embodiments, a specialized wrench, like an Allen bolt adaptor, may be necessary to remove the adaptor lug nut.

CONCLUSION

Several embodiments of the present disclosure have been described. While this specification contains many specific implementation details, these should not be construed as limitations on the scope of any disclosures or of what may be claimed, but rather as descriptions of features specific to particular embodiments of the present disclosure. While embodiments of the present disclosure are described herein by way of example using several illustrative drawings, those skilled in the art will recognize the present disclosure is not limited to the embodiments or drawings described. It should be understood the drawings and the detailed description herein are not intended to limit the present disclosure to the form disclosed. Instead, the present disclosure is meant to encompass modifications, equivalents, and alternatives falling within the spirit and scope of embodiments of the present disclosure, as defined by the appended claims.

The headings used herein are for organization purposes only and are not meant to be used to limit the scope of the description or the claims. As used throughout this application, the word "may" is used in a permissive sense (i.e., meaning having the potential to), rather than the mandatory sense (i.e., meaning must). Similarly, the word "include" (and derivatives thereof) means including but not limited to. To facilitate understanding, like reference numerals have been used, where possible, to designate like elements common to the figures.

The phrases "at least one," "one or more," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B, and C together.

The term "a" or "an" entity means one or more of that entity. As such, "a"/"an," "one or more," and "at least one" are used interchangeably herein. Additionally, "comprising," "including," and "having" can be used interchangeably.

Certain features that are described in this specification in the context of separate embodiments can also be implemented in combination in a single embodiment. Conversely, various features that are described in the context of a single embodiment can also be implemented in combination in multiple embodiments separately or in any suitable subcombination. Moreover, although features may be described above as acting in certain combinations and even initially claimed as such, one or more features from a claimed combination an, in some cases, be excised from the combination, and the claimed combination may be directed to a sub-combination or a variation of a sub-combination.

What is claimed is:

1. An adaptable center cap system for attachment to a wheel, the system comprising:
    a center cap, comprising one or more lug holes arranged across a surface of the center cap, wherein the lug holes extend in an axial direction through a body of the center cap:
    a first spacer for insertion into at least one of the lug holes, wherein the spacer comprises an upper cylindrical portion having a first outside diameter, a lower cylindrical portion having a second outside diameter, and a cylindrical hole extending through the respective upper cylindrical portion and the lower cylindrical portion;
    an adaptor lug nut, comprising a slot adapted to receive a screw, a threaded cavity suitable for attachment to a lug on a car, and a longitudinal pattern of grooves on a longitudinal surface of the adaptor lug nut; and
    the screw extending through one of the lug holes in the center cap, the spacer, and an end of the adaptor lug nut.

2. The adaptable center cap system of claim 1, wherein the lug holes are threaded.

3. The adaptable center cap system of claim 1, wherein the upper cylindrical portion of the spacer further comprises a ridge.

4. The adaptable center cap system of claim 3, wherein the ridge comprises the cylindrical hole for receiving the screw.

5. The adaptable center cap system of claim 1, further comprising a second spacer, wherein an upper cylindrical portion of the second spacer has a diameter sized to receive the lower cylindrical portion of the first spacer.

6. The adaptable center cap system of claim 1, wherein the slot includes a chamfer.

7. The adaptable center cap system of claim 6, wherein the chamfer has an angle between 15 and 90 degrees.

8. The adaptable center cap system of claim 7, wherein the slot is threaded with an M4 thread.

9. The adaptable center cap system of claim 7, wherein a thread in the slot has an opposite thread direction from the thread in the threaded cavity.

10. The adaptable center cap system of claim 6, wherein the chamfer has an obtuse angle.

11. The adaptable center cap system of claim 1, wherein the slot is threaded.

12. The adaptable center cap system of claim 1, wherein the screw is made of steel.

13. The adaptable center cap system of claim 1, wherein the center cap has five lug holes.

14. The adaptable center cap system of claim 1, wherein the center cap has six lug holes.

15. The adaptable center cap system of claim 1, wherein the center cap further comprises a decorative emblem.

16. A method for adapting a center cap to a nonstandard wheel, the method comprising the steps of:
    inserting a spacer into respective center cap holes on the center cap, wherein the locations of the respective center cap holes correspond with respective locations of lug holes on the nonstandard wheel, and wherein the spacer comprises an upper substantially circular portion with a first outside diameter and a lower substantially circular portion with a second outside diameter;
    inserting a proximate end of an adaptor lug nut into the spacer, wherein each adaptor lug nut comprises a threaded cavity for receiving a screw and a longitudinal groove;
    inserting a distal end of each respective adaptor lug nut into the respective lug hole on the nonstandard wheel;
    inserting the screw into a respective center cap hole, through the spacer, and into the threaded cavity, on the proximate end of the adaptor lug nut; and
    tightening the screw to cause the center cap to sit in a substantially flush manner on a face of the nonstandard wheel.

17. The method of claim 16, further comprising the step of inserting a second spacer into the first spacer, wherein an upper substantially circular portion of the second spacer has a diameter sized to receive the lower substantially circular portion of the first spacer.

18. The method of claim 17, wherein the step of inserting the screw further includes inserting the screw through the second spacer.

19. The method of claim 16, wherein the threaded cavity includes a chamfer.

* * * * *